United States Patent
Brussel et al.

(10) Patent No.: US 6,221,293 B1
(45) Date of Patent: *Apr. 24, 2001

(54) METHOD FOR PRODUCING A COMPOUND FROM PLASTIC WITH FIXED FIBRE INSERT

(75) Inventors: Richard Brussel, Sulzfeld; Rudolf Kuhfusz, Gondelsheim, both of (DE)

(73) Assignee: Menxolit-Fibron GmbH, Bretten (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/011,687
(22) PCT Filed: Aug. 14, 1996
(86) PCT No.: PCT/EP96/03588
§ 371 Date: Dec. 9, 1998
§ 102(e) Date: Dec. 9, 1998
(87) PCT Pub. No.: WO97/06936
PCT Pub. Date: Feb. 27, 1997

(30) Foreign Application Priority Data

Aug. 16, 1995 (DE) .............................. 195 30 020

(51) Int. Cl.⁷ .................................................. B29C 47/00
(52) U.S. Cl. ........................ 264/136; 264/37.32; 264/137; 264/145; 264/171.1; 264/177.2; 264/920; 425/114
(58) Field of Search ..................... 264/136, 137, 264/145, 140, 349, 171.1, 148, 177.2, 211.21, 211.22, 37.32, 920; 425/113, 114

(56) References Cited

U.S. PATENT DOCUMENTS

| 4,439,387 | * | 3/1984 | Hawley ................................ 264/108 |
| 5,110,275 | * | 5/1992 | Scheuring ............................ 425/113 |
| 5,213,889 | * | 5/1993 | Cogswell et al. .................... 428/332 |
| 5,433,419 | * | 7/1995 | Murakami ............................ 264/136 |
| 5,637,270 | * | 6/1997 | Amaike et al. ....................... 264/136 |
| 5,639,410 | * | 6/1997 | Amaike et al. ....................... 264/136 |
| 5,658,513 | * | 8/1997 | Amaike et al. .................. 264/171.13 |
| 5,783,125 | * | 7/1998 | Bastone et al. ..................... 264/45.2 |
| 5,879,602 | * | 3/1999 | Scheuring ............................ 264/136 |

FOREIGN PATENT DOCUMENTS 2 357 112 * 6/1974 (DE) .
0 339 906 * 11/1989 (EP) .

* cited by examiner

Primary Examiner—Jan H. Silbaugh
Assistant Examiner—Mark Eashoo
(74) Attorney, Agent, or Firm—Antonelli, Terry, Stout & Kraus, LLP

(57) ABSTRACT

A method for producing a compound from a plastics material with fixed fiber inlay uses a heated screw-type extruder (1) in which filaments (2) are drawn by means of automatic drawing-in, are cut up and mixed there and are subsequently removed as a finished fiber compound. To achieve a high content of long fibers in the finished fiber compound, before entering the extruder (1) the filaments (2) are impregnated with the plastics material in an impregnation tool (3).

19 Claims, 1 Drawing Sheet

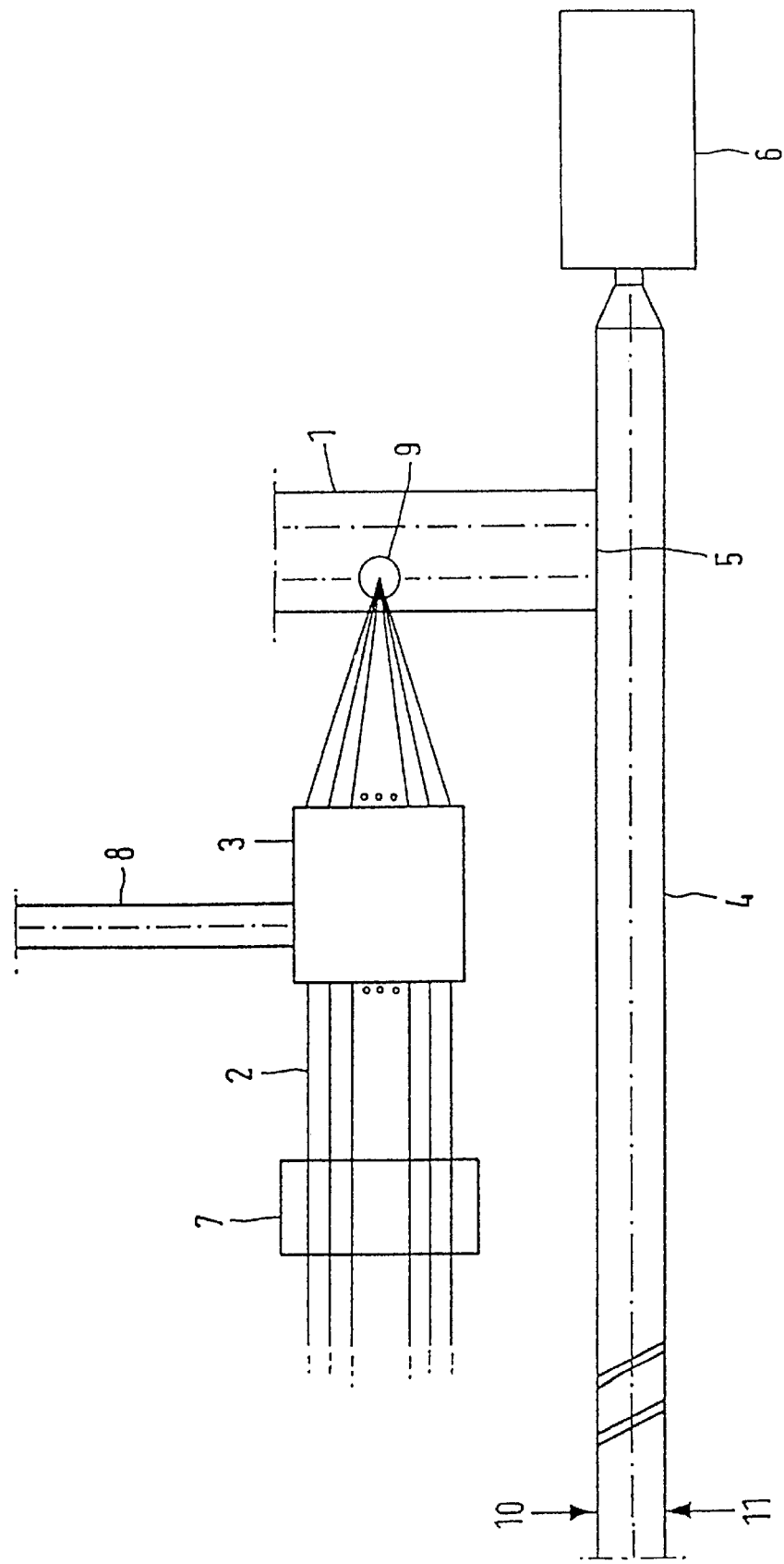

METHOD FOR PRODUCING A COMPOUND FROM PLASTIC WITH FIXED FIBRE INSERT

BACKGROUND OF THE INVENTION

The invention relates to a method for producing a compound from a plastics material with fixed fibre insert.

EP 0 416 859 B1 discloses an extruding device and a method for mixing fibres and thermoplastic plastics. For this purpose, thermoplastic plastics and discrete lengths of reinforcing fibres are introduced into a screw-type extruder and mixed. After a relatively long mixing path the finished fibre compound arrives in a cutting and handling unit and is processed further there.

In addition, the article "Direktverarbeitung von Endlosfasern auf Spritzgießmaschinen", F. Truckenmüller and H.-G. Fritz, Stuttgart, authors' production run from the journal "Kunststoffe", 82nd year 1992, Carl Hanser Verlag, Munich, describes a method of Bayer AG, Leverkusen, of introducing the reinforcing fibres as filaments, so-called rovings, by means of direct drawing into the screw-type extruder. Accordingly, the thermoplastic plastics material and the dry filaments are introduced into the extruder, cut and mixed, until after a relatively long mixing path the finished fibre compound is produced. EP 0 124 003 B1 is also concerned with this method.

Both methods have the serious disadvantage that a long path is necessary for mixing the plastics material with the fibres. The fibres are repeatedly partially broken in the extruder by means of shearing forces on this long mixing path, which is often also equipped with specific plasticizing and mixing zones, with the result that their length at the output of the extruder is substantially shorter than at the inlet or shortly thereafter. In the quoted article "Direktverarbeitung von Endlosfasern auf Spritzgießmaschinen" the main part of the fibre length in the finished fibre compound is indicated as 1 to 2 mm. However, this is too small for a fibre-reinforced compound with high resistance to breaking.

SUMMARY OF THE INVENTION

The object of the invention, therefore, is to provide a method for producing a compound from a plastics material with fixed fibre insert using a heated screw-type extruder, with which a predominant content of long fibres with a fibre length of 10 to 50 mm is to be achieved in the finished compound.

In accordance with the invention the object is achieved by impregnating the filaments with the plastics material in an impregnation tool before entering the extruder.

As a result of impregnating the filaments in the impregnation tool, the filaments entrain the necessary plastics material straight away when entering into the extruder. Therefore, the mixing of the plastics material with the filaments in the extruder, as in the prior art, is omitted. In this way the long mixing path is also unnecessary because in the extruder the filaments only have to be cut up and mixed a little. As a result of the omission of the long mixing path, an extremely high content of long fibres in the finished fibre compound is achieved.

Any commercial device such as described in EP 0 287 427 B1 for example, is suitable as impregnation tool. However, other impregnation methods are also advantageous. The filaments are preferably introduced preheated into the impregnation tool for better wetting with the plastics material.

A thermoplastic plastics material, preferably polypropylene, is advantageously used as plastics material in accordance with the invention. Alternatively, a thermosetting liquid plastics material, preferably a polyester resin, can also be used as plastics material. When using thermosetting liquid plastics material the preheating of the filaments is omitted.

In order to obtain the correct mixing ratio between fibres and plastics material, melted recycle chips and/or additionally melted plastics material are added to the fibre compound as manufactured. Recycle chips are obtained in the production of the shaped parts and have hitherto been a waste material.

For this purpose the outlet of the extruder is preferably connected to an inlet of a second screw-type extruder, with the second extruder conveying melted recycle chips and/or plastics material in the flow direction in front of the inlet. Finally, the finished fibre compound is supplied to a known cutting and handling unit for plastics material.

In a preferred embodiment the filaments are glass fibres.

BRIEF DESCRIPTION OF THE DRAWING

Further features of the invention are evident from the FIGURE which shows an exemplifying embodiment and is described in detail in the following.

DETAILED DESCRIPTION OF THE PREFERRED EMBODIMENT

Filaments, here glass fibres, are indicated by the reference symbol 2, the glass fibres being unwound from coils which are not shown. After the filaments 2 have passed through the heater 7, they arrive in an impregnation tool 3 where they are impregnated with polypropylene. The polypropylene is conveyed by way of a screw-type extruder 8 into the impregnation tool 3 where it wets the filaments 2. The impregnation tool 3 is arranged such that an outlet of the impregnation tool is spaced from a heated screw-type extruder 1 which has an inlet 9. The filaments 2 now impregnated with plastics material are automatically drawn into the extruder 1 by means of direct drawing-in by way of this inlet 9. The drawing-in region of the extruder 1 is formed in such a way that the pulling forces can be applied to the filaments by means of the impregnation tool. In this example the extruder 1 has a double screw. However, a single-screw extruder can be used equally well.

The impregnated filaments 2 are cut and mixed in the extruder 1 after the drawing-in region. However, for this process only a short extruder 1 is necessary because the filaments 2 already bring along the necessary plastics material by means of the upstream impregnation tool 3. The inlet 9 in the extruder 1 cannot become blocked because the filaments 2 constantly clean the drawing-in bore.

The outlet from the extruder 1 is connected to an inlet 5 of a second screw-type extruder 4. This extruder 4 is drawn, by way of example, as a single-screw extruder. In this second extruder 4 melted recycle chips 10 and/or plastics material 11 are conveyed in front of the inlet 5. These melted recyclechips or plastics material are then mixed with the fibre compound from the extruder 1, with it being possible that the fibre content in the plastics material to be able to be apportioned exactly.

The finished fibre compound is subsequently supplied to a cutting and handling device 6 for plasticised material.

What is claimed is:

1. A method for producing a compound from a plastics material with fixed fibre inlay, comprising the steps:

drawing filaments (2), by means of automatic drawing-in, into a heated screw extruder (1) wherein the filaments are cut up and mixed therein; and subsequently removing a finished fibre compound having the filaments (2) impregnated with the plastics material before entering the screw extruder, characterized in that;

the filaments (2) are impregnated with the plastics material in an impregnation tool (3) wherein an outlet of the impregnation tool is spaced from the screw extruder in which the fibre-reinforced plastics material is formed.

2. Method according to claim 1, characterized in that a thermoplastic plastics material is used as plastics material.

3. Method according to claim 2, wherein the thermoplastic plastic material is polypropylene.

4. Method according to claim 1, characterized in that a thermosetting liquid plastics material is used the plastics material.

5. Method according to claim 4, wherein the thermosetting liquid plastics material is a polyester resin.

6. Method according to claim 1, characterized in that the filaments (2) are introduced preheated into the impregnation tool (3).

7. Method according to claim 1, characterized in that melted recycle chips and/or additional melted plastics material are added to the finished fibre compound.

8. Method according to claim 7, characterized in that the outlet of the extruder (1) is connected to an inlet (5) of a second screw extruder (4) and the second extruder (4) conveys melted recycle chips and/or plastics material in a flow direction in front of the inlet (5).

9. Method according to claim 1, characterized in that the finished fibre compound is supplied to a plasticized material cutting and handling unit (6).

10. Method according to claim 1, characterized in that the filaments (2) are glass fibres.

11. A method for producing a fibre-reinforced plastic material, comprising:

introducing filaments into an impregnation tool;

introducing a plastics material into the impregnation tool;

wetting the filaments with the plastics material in the impregnation tool to provide impregnated filaments impregnated with the plastics material;

passing the impregnated filaments out of the impregnation tool and then drawing the impregnated filaments into an inlet of a screw extruder space downstream from the impregnation tool, wherein an outlet of the impregnation tool is spaced from the screw extruder in which the fibre-reinforced plastics material is formed;

cutting up filaments and mixing the filaments and plastics material in the screw extruder to form a fibre-reinforced plastics material; and removing the fibre-reinforced plastics material from the screw extruder.

12. Method according to claim 11, further comprising introducing the fibre-reinforced plastics material into a second screw extruder in which melted recycled chips and/or additional melted plastics materials are being conveyed.

13. Method according to claim 11, characterized in that a thermoplastic plastics material is used as the plastics material.

14. Method according to claim 13, wherein the thermoplastic plastic material is polypropylene.

15. Method according to claim 11, characterized in that a thermosetting liquid plastics material is used as the plastics material.

16. Method according to claim 15, wherein the thermo setting liquid plastics material is a polyester resin.

17. Method according to claim 11, characterized in that the filaments are introduced preheated into the impregnation tool.

18. Method according to claim 11, characterized in that the fibre-reinforced plastics material is supplied to a cutting and handling device for plasticized material.

19. Method according to claim 11, characterized in that the filaments are glass fibres.

* * * * *